(12) United States Patent
Cagle

(10) Patent No.: US 11,528,901 B2
(45) Date of Patent: Dec. 20, 2022

(54) COLLAPSIBLE DECOY

(71) Applicant: AdvenTech, LLC, Newport, NC (US)

(72) Inventor: Matthew F. Cagle, Morehead City, NC (US)

(73) Assignee: AdvenTech LLC, Newport, NC (US)

( * ) Notice: Subject to any disclaimer, the term of this patent is extended or adjusted under 35 U.S.C. 154(b) by 355 days.

(21) Appl. No.: 16/657,363

(22) Filed: Oct. 18, 2019

(65) Prior Publication Data

US 2020/0120922 A1 Apr. 23, 2020

Related U.S. Application Data

(60) Provisional application No. 62/748,727, filed on Oct. 22, 2018.

(51) Int. Cl.
*A01M 31/06* (2006.01)
(52) U.S. Cl.
CPC .................................. *A01M 31/06* (2013.01)
(58) Field of Classification Search
CPC .................................................... A01M 31/06
See application file for complete search history.

(56) References Cited

U.S. PATENT DOCUMENTS

| | | | |
|---|---|---|---|
| 1,822,763 A * | 9/1931 | Cook ................... | A01M 31/06 43/3 |
| 2,466,626 A | 4/1949 | Valasek | |
| 2,536,338 A | 1/1951 | Withey et al. | |
| 2,545,800 A | 3/1951 | Viken | |
| 2,651,873 A * | 9/1953 | Risch .................... | A01M 31/06 43/3 |
| 2,755,588 A * | 7/1956 | Johnson ................ | A01M 31/06 43/3 |
| 3,704,538 A * | 12/1972 | Gagnon ................ | A01M 31/06 43/3 |
| 3,888,032 A * | 6/1975 | Gagnon ................ | A01M 31/06 43/3 |
| 4,023,297 A * | 5/1977 | Jorgensen ............ | A01M 31/06 43/3 |
| D268,047 S | 2/1983 | Fulster | |
| D268,862 S | 5/1983 | Fulster | |
| D268,863 S | 5/1983 | Fulster | |
| D270,656 S | 9/1983 | Fulster | |
| D404,791 S | 1/1999 | Swiecki et al. | |
| 2001/0029691 A1 | 10/2001 | Angelone | |

(Continued)

FOREIGN PATENT DOCUMENTS

CA 2467294 A1 5/2004

*Primary Examiner* — Monica L Perry
*Assistant Examiner* — Brittany A Lowery
(74) *Attorney, Agent, or Firm* — BakerHostetler

(57) ABSTRACT

A decoy comprising a decoy body having an upper portion shaped to resemble water fowl and a lower portion extending downward from the upper portion; the decoy body including an outer wall defining a cavity therein, wherein the decoy body is constructed of a collapsible shape memory polymer material having an initial volume that collapses under a compressive force to form a second volume that is less than the initial volume, and wherein upon release of the compressive force, the decoy body returns to the initial volume; the lower portion of the decoy body includes an integral keel having a greater thickness than the wall to form a concentrated mass in the lower portion.

18 Claims, 16 Drawing Sheets

(56) References Cited

U.S. PATENT DOCUMENTS

| | | | | |
|---|---|---|---|---|
| 2002/0020101 A1* | 2/2002 | Murray | ............... | A01M 31/06 43/3 |
| 2007/0266613 A1* | 11/2007 | Nelson | ............... | A01M 31/06 43/3 |
| 2009/0126253 A1* | 5/2009 | Wood | ................ | A01M 31/06 29/469 |
| 2017/0280705 A1* | 10/2017 | Burcham | ........... | B29C 33/3842 |

* cited by examiner

US 11,528,901 B2

COLLAPSIBLE DECOY

TECHNICAL FIELD

In general, the present disclosure relates to a decoy used in connection with the hunting of water fowl. More particularly, the present disclosure relates to a decoy having a collapsible body, having a shape memory that allows the body to automatically return to its desired shape when collapsed. Still more particularly, the present disclosure relates to a collapsible decoy that has an assembly to self-right the decoy.

SUMMARY

The present disclosure generally provides a decoy comprising a decoy body having an upper portion shaped to resemble water fowl and a lower portion extending downward from the upper portion; the decoy body including an outer wall defining a cavity therein, wherein the decoy body is constructed of a collapsible shape memory polymer material having an initial volume that collapses under a compressive force to form a second volume that is less than the initial volume, and wherein upon release of the compressive force, the decoy body returns to the initial volume; the lower portion of the decoy body includes an integral keel having a greater thickness than the wall to form a concentrated mass in the lower portion.

The present disclosure further provides a decoy comprising a decoy body having a centerline, the decoy body having an upper portion and a lower portion separated by a horizontal plane, wherein the upper portion has a perimeter above the horizontal plane and the lower portion extends downward relative to the upper portion; the decoy body including an outer wall defining a cavity therein, wherein the outer wall of body is constructed of a polymer material, the decoy body having an initial volume, wherein the outer wall is configured to collapse under a compressive force to assume a second volume that is less than the initial volume, and wherein upon release of the compressive force, the decoy body is configured to return to the initial volume; at least one outrigger portion extending from the upper portion near the perimeter downward below the horizontal plane; the at least one outrigger portion being spaced from at least a portion of the lower portion to define a gap therebetween.

DETAILED DESCRIPTION

In hunting, decoys are often used to attract game. Decoys are typically dispersed on bodies of water and held in place by an anchor. Often when hunting, several decoys are deployed. For example, anywhere from one to six dozen decoys may be deployed on a body of water to provide the appearance that a flock of water fowl are on the water. The hunter must transport the decoys from a place of storage to the location where the decoys are deployed, often carrying the decoys over rough terrain, streams, marshes, and manmade obstacles. Typical decoys are constructed from hard plastic, wood, and solid foam, such that the decoys are generally bulky. The Applicant's prior U.S. Pat. No. 7,475, 509 describes an anchor system having a sliding weight that facilitates carrying the decoys using the free end of an anchor. Although improving the ability to carry the decoys, the system does not reduce the bulk of the decoys themselves. This bulk affects the ability to transfer the decoys and the space required to store them. With that in mind, the Applicant has devised a collapsible decoy that may be compressed for purposes of storage and transport, allowing the decoy to fit in a more confined space than when the decoy is an uncompressed state.

At least one other attempt to produce collapsible decoys has been made. In particular U.S. Pat. No. 3,888,032 describes a decoy that has a removable head that fits to a flexible resilient shell that is described as being collapsible by applying pressure to the shell and returns to a working position when pressure is released. The '032 patent also includes a keel that must be attached to the shell and anchored by attaching an anchoring cord to the keel to hold the shell in an upright position on the water. The '032 patent describes a shell as being resilient, an outer molded structure with an opening in the tail that receives a plug that allows the interior of the shell to be selectively opened and closed. The plug is removed to allow the body to be collapsed. There is no disclosure of a particular resilient material nor is there any indication of the degree to which the decoy may be collapsed. The head of the decoy is made removable, presumably to facilitate molding of the shell with a hollow cavity therein. While the '032 patent provides the conclusory claim that the body does not require inflation after it is collapsed, the particular material used to achieve this is not disclosed in the '032 patent. Moreover, the fact that the head must be removed and attached to collapse the decoy and return it to a working condition provides additional assembly that is undesirable in the context of packing the decoys for transport and more importantly, for reassembling the decoys for use. Often, decoys are dispersed before dawn when there is little light to assemble the decoys as described. This process is exacerbated by the fact that the '032 patent also includes a detachable keel.

Figure 1:
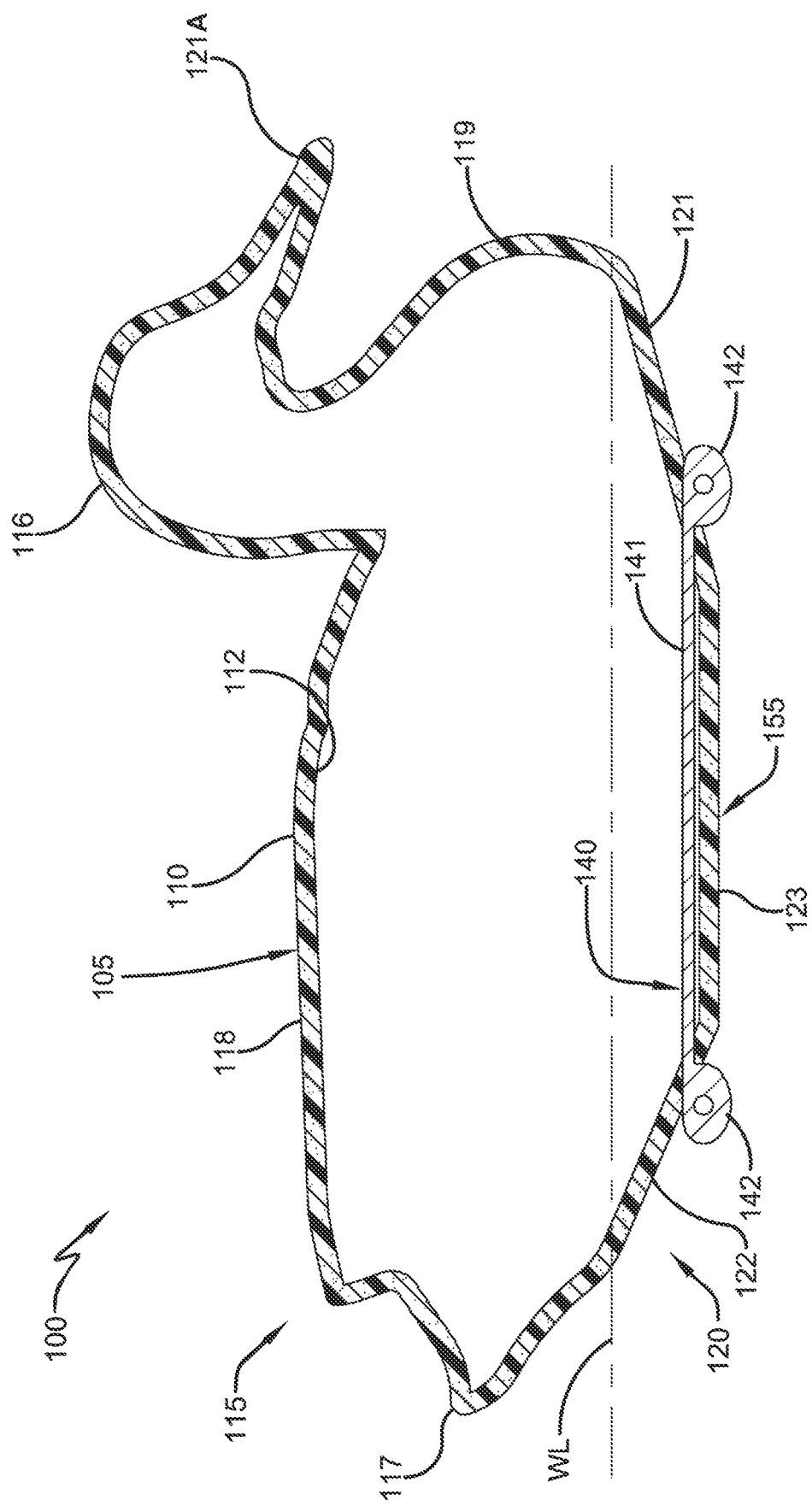
FIG. 1 is a sectioned side view of a decoy according to an example of disclosure.

The following examples address these shortcomings in the existing collapsible decoy and provides other improvements that will become apparent in the following description. A decoy according to examples of the disclosure is generally indicated by the number 100 in the accompanying drawings. Decoy 100 is made to be a unitary and collapsible body 105 such that the owner does not need to assemble the decoy in the field. Decoy 100 includes a unitary outer wall 110 that forms the body 105. Body 105 may include upper portion 115 and a lower portion 120. Upper portion 115 sits above the water line (WL). Decoy body 105 defines a hollow interior cavity 112. Wall 110 defines an upper portion 115, and a lower portion 120. Upper portion 115 sits above the water line (WL) and is visible to water fowl from above. Upper portion 115, therefore, is molded to have a shape resembling water fowl, including, but not limited to a duck, a goose, and the like. It will be understood that other shapes useful in attracting water fowl may also be used. The shape of upper portion 115 is limited only by the imagination of the designer and may vary to a significant extent. In the example shown, upper portion 115 is designed to resemble a duck. Upper portion 115 includes a head portion 116, a tail portion 117, a back portion 118, and a breast portion 119. As best shown in FIG. 1, these portions are formed from wall 110 as a unitary member. Or as shown in other examples, the upper portion may be formed from halves or other pieces that are joined together. Lower portion 120 may likewise be formed with the same wall 110 (FIG. 1), or as a separate piece that is joined to upper portion (FIG. 9) as described more completely below. In accordance with other examples, portions of the upper portion 115 may be solid, such that the wall has portions of greater thickness. For example, as depicted in FIG. 1, the beak portion 121(A) which is a relatively thin member, may be formed from solid material lacking a cavity therein.

Figure 9:
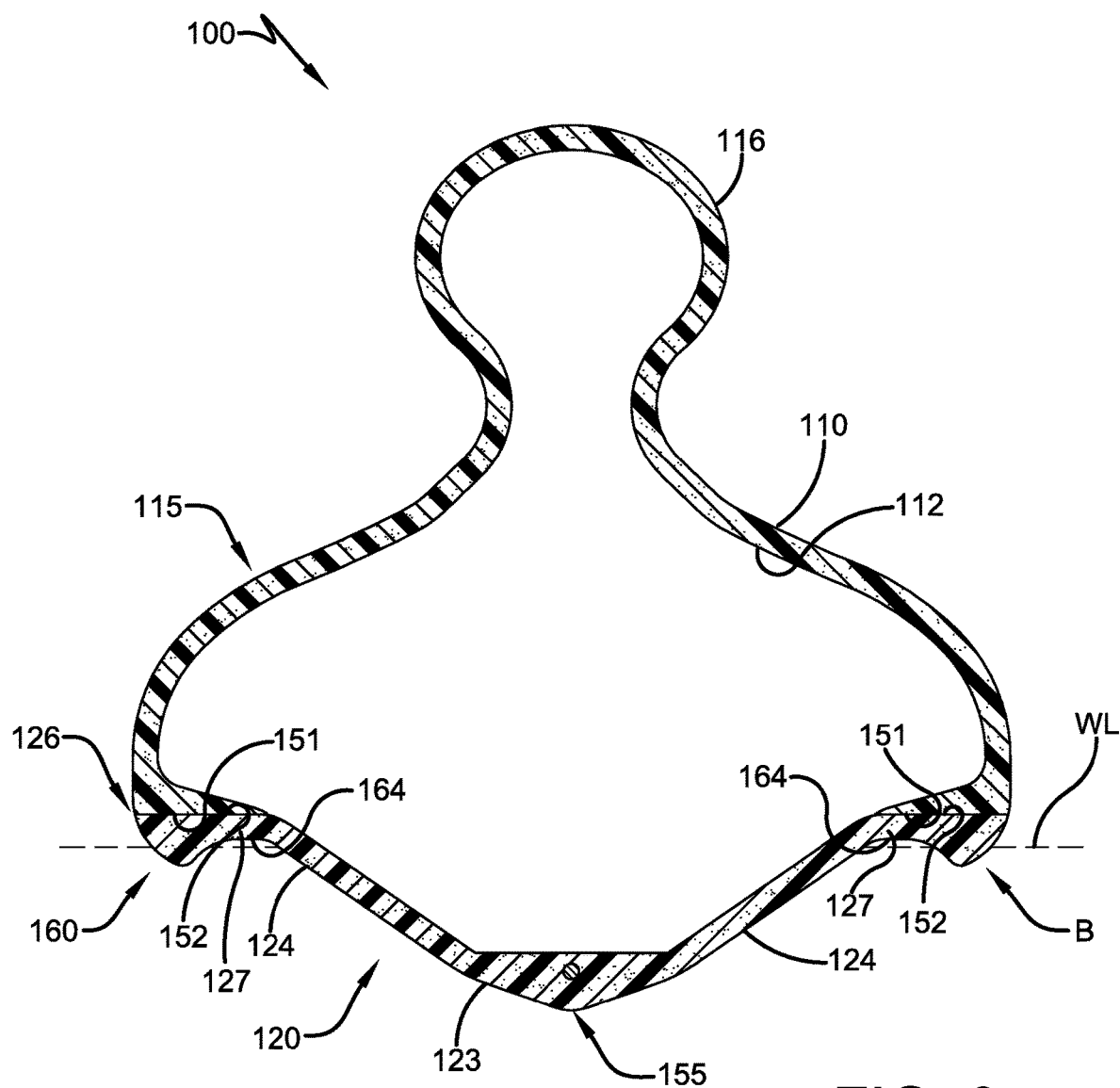
FIG. 9 is a sectioned view as might be seen along line 9-9 in FIG. 8.
Figure 10:
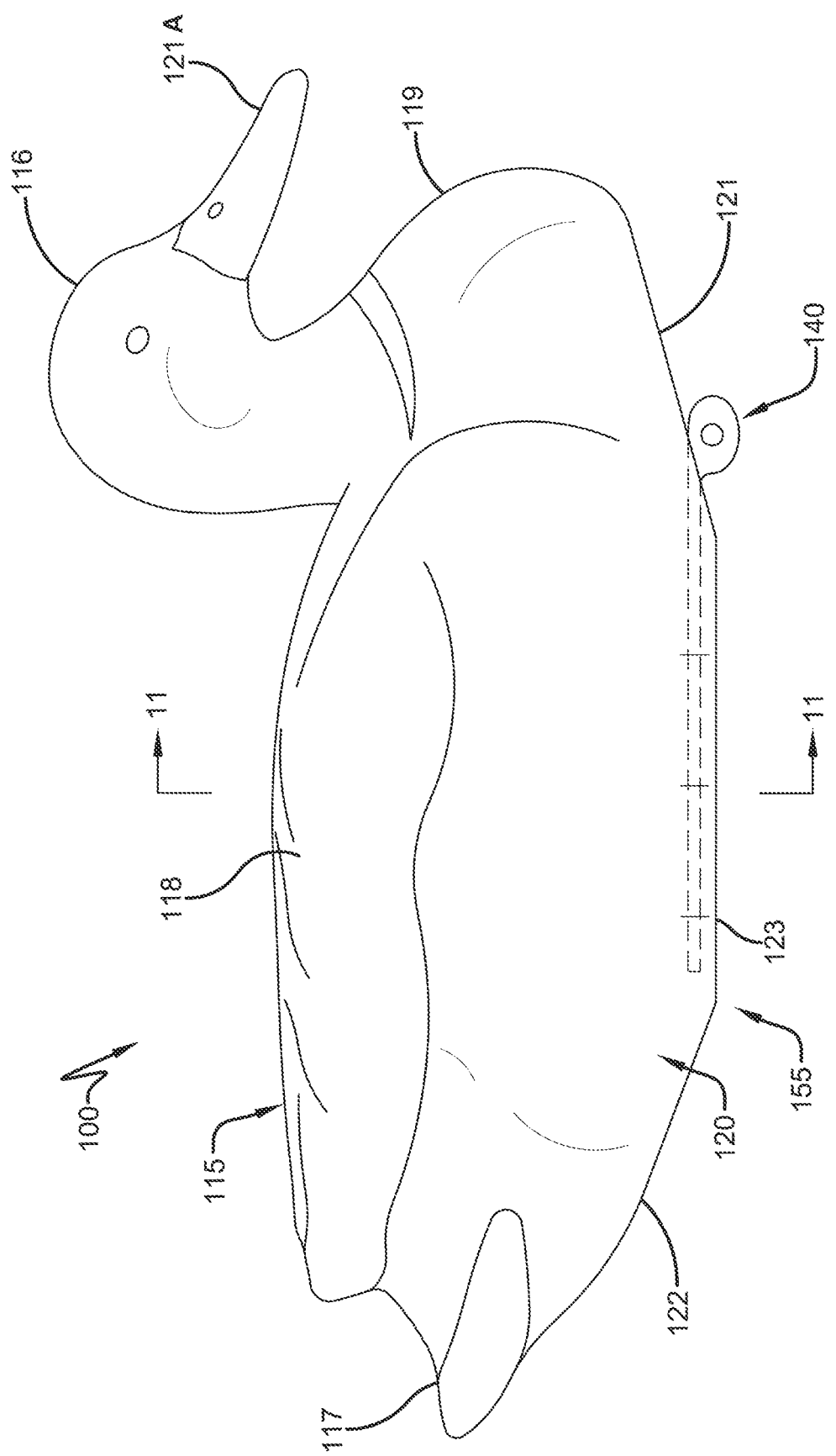
FIG. 10 is a side view of a decoy according to yet another example.

With continued reference to FIG. 1, the lower portion 120 may include fore and aft portion 121,122 that angle downward and inward from the breast 119 and tail portion 117 of upper portion 115. The fore and aft portions 121, 122 may be connected by center portion 123. As best shown in FIGS. 2,9 and 10, center portion 123 may form the lowermost portion of decoy 100 and include side portions 124 (FIG. 2,9, 11) that extend upward and laterally outward therefrom to join the sides of decoy 100. In the example shown, the lower portion 120 of decoy terminates at the centerline A in a somewhat triangular keel, described more completely below, with side portions sweeping upward and outward from center line at equal angles. As shown in FIGS. 2 and 9, the wall 110 forming lower portion 120 may extend horizontally from the ends of side portions 124 at 127 where it joins the sides of upper portion 115.

As shown, decoy 100 is made hollow, defining an internal cavity 112, to facilitate collapse of the decoy 100. The hollow nature of decoy 100 may also provide buoyancy to help the decoy 100 float on the water. The material used to form the wall 110 of decoy 100 is selected to allow the decoy 100 to be compressed by an outside force. Compressing the decoy 100 causes it to take up less space when storing or transporting the decoy 100. The material may also be selected to allow the decoy 100 to return to its original shape when a compressive force is released, i.e. having a shape memory. The material may be selected to have a suitable density with consideration of the size of the cavity to ensure that the decoy 100 will float. For example, materials having a density of 200-600 kg/m$^3$ are believed to be suitable. A foam having a density of about 350 kg/m$^3$ was found suitable in one example. It is expected that materials having a density of less than 200 kg/m$^3$ would be suitable as well.

It is expected that a number of polymer materials may be suitable. These materials may, include closed cell or open cell foams that are suitable for use in water. For example, polystyrene and polyurethane foams or foamed materials may be suitable. Flexible cellular foams, including but not limited to cast polyurethane elastomers may also be suitable. According to one example, a poly-vinyl-chloride material was found suitable. According to another example, a cast polyurethane elastomer foam was used. The material properties for the cast polyurethane example material were found suitable for the decoy application and include a density of about 350 kg/m$^3$; a hardness of about 20-25; a tensile strength of about 0.54×10$^6$ Pa; a tensile elongation at break of about 93.1%; and an avulsion strength of about 1.66 N/mm.

When foams are used, the foams may be self-skinning or integral skinning foams that form a skin during the molding process to provide further water resistance or impermeability. Alternatively, the exterior surface of the foam may be skinned during the molding process through suitable chemical or heat treatments. Likewise, skins may be formed after molding using light or heat treatment as well.

Figure 5:
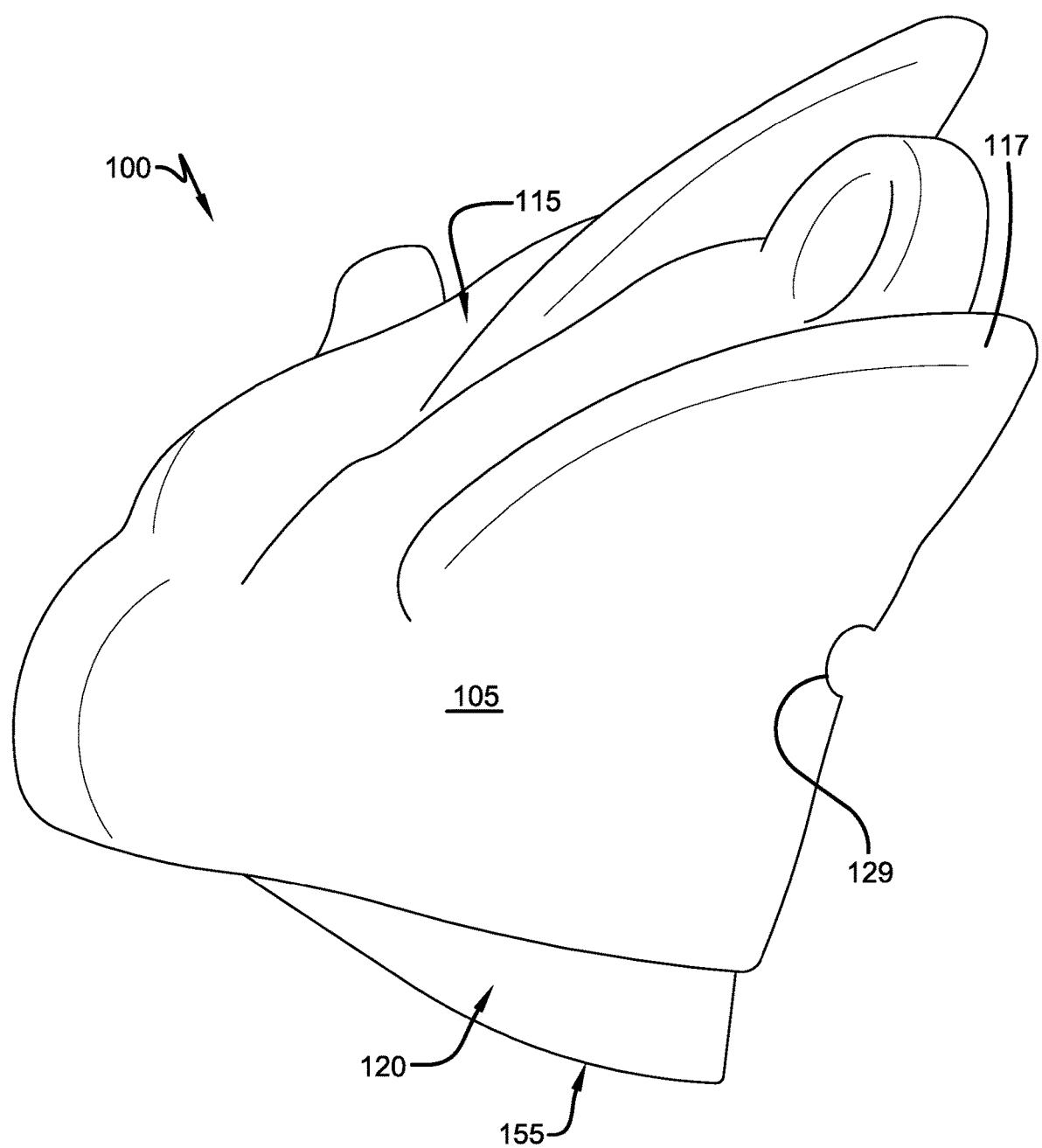
FIG. 5 is a rear view thereof.
Figure 6:
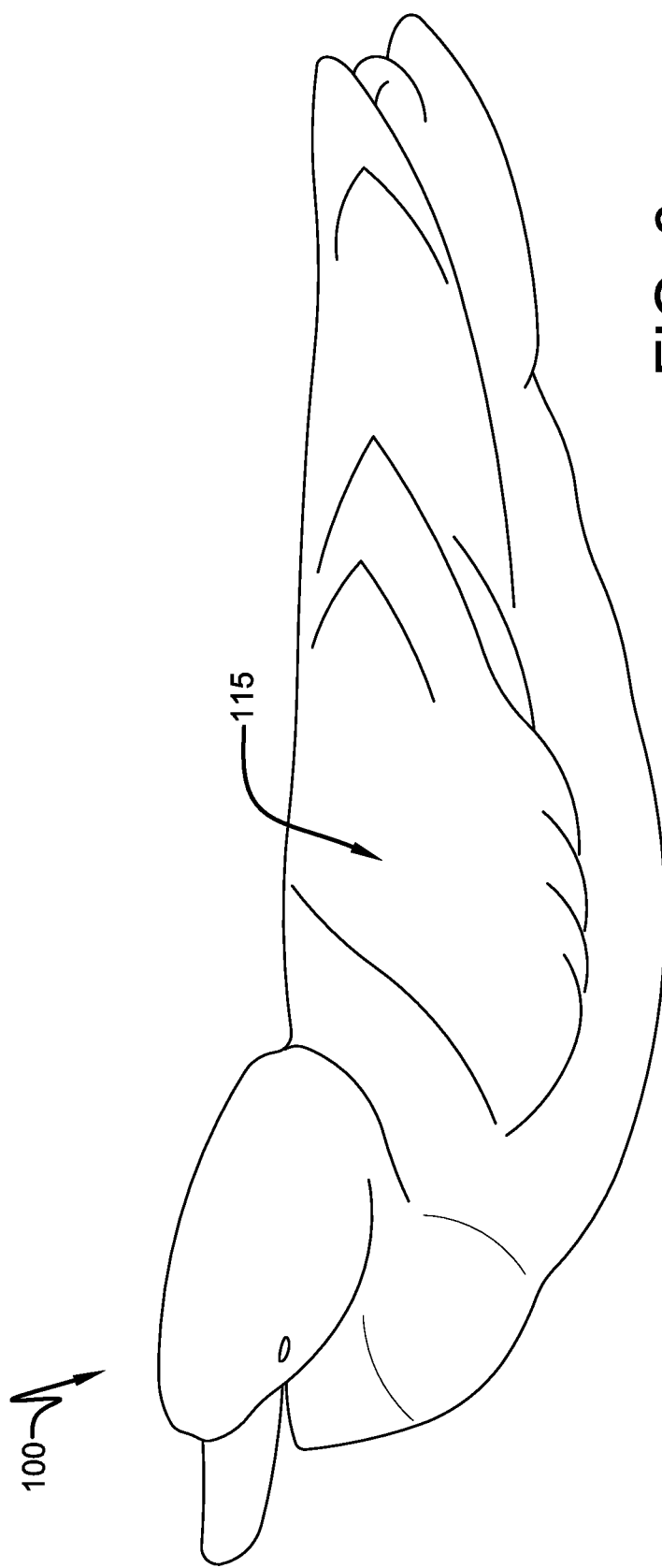
FIG. 6 is a top view thereof.
Figure 7:
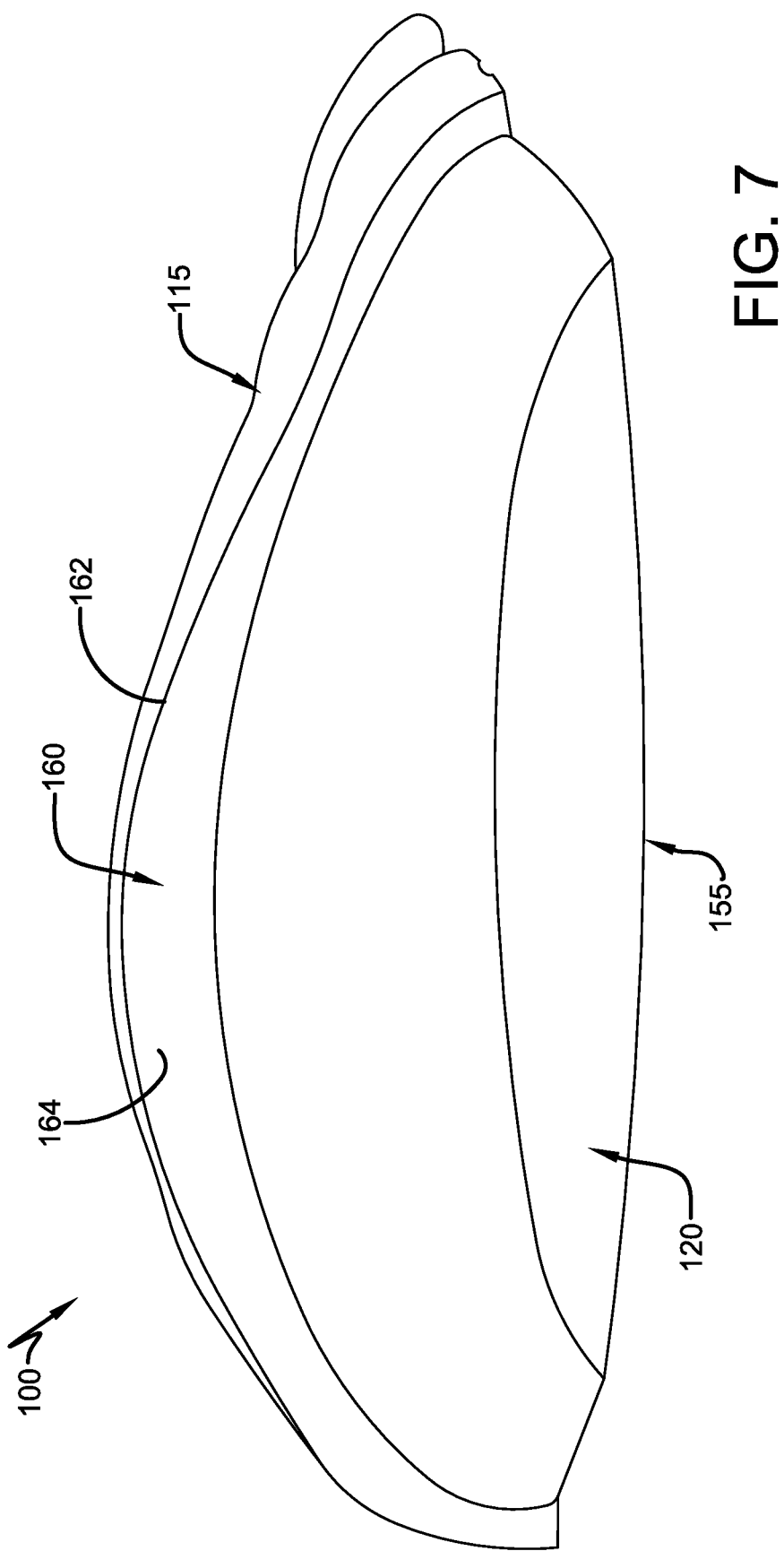
FIG. 7 is a bottom view thereof.

As an option, body may be constructed to be gas permeable to facilitate collapse of the body and returning it to its original shape. Suitable foam materials, such as open cell foams may be sufficiently gas permeable to allow the foam material to breath to facilitate this function. For non-permeable foams or when a skin makes the outer surface of the body gas impermeable, at least one port or other pore may be provided within the skin or wall 110 of the body 105 to allow gas within the decoy body to evacuate as it is compressed and return when the compressive force is released. In one example, a vent 129 is formed in wall 110 of the body 105. With reference to FIG. 5, vent 129 may be provided along the seam between adjacent haves at the tail portion 117 of decoy body above the waterline. In the example, vent is located about half way between the waterline and a tail of the decoy body. While vent may be located at any point on body, providing a vent above the waterline yet below the upper surface of body is believed to be useful in preventing water from being drawn in by suction created as the decoy transitions from a collapsed to a non-collapsed configuration. For example, it is possible that the user will pull collapsed decoys from a bag or other container that provides a compressive force and immediately launch them into a body of water such that the decoy body may be in the process of expanding to its normal configuration when it hits the water permitting the suction created by expansion of the hollow volume within the decoy to draw water in through vent. Given that higher concentrations of material form the base and back, it is believed that it is more likely that these sections are more likely to hit the water when the decoy is tossed.

As best shown in FIG. 2, to define the cavity 112, decoy 100 may be molded in two or more parts. In one example, decoy 100 is molded in two halves separated by a vertical axis A located at the center of the decoy 100. In the example shown, the halves are symmetrical, but in other examples, non-symmetrical halves may be used. Once the halves are formed, they may be joined to form a complete decoy using a suitable fastener, generally indicated by the number 125 such as adhesives, chemical bonds, welds, mechanical fasteners or combinations thereof. In the example, a mechanical fastener 126 is used. Mechanical fastener 126 includes a tongue and groove joint generally indicated by the number 130 and best shown in FIG. 2A. This joint extends along an upper portion 115 of the decoy. The lower portion of the decoy 120 may include a second mechanical fastener (FIG. 2B) that includes a tongue and groove joint 132 and a lap joint 134. It will be understood that these mechanical fasteners may also be further joined using a suitable adhesive, weld or other fastener or combinations thereof. Therefore, the examples depicted should not be considered limiting.

Figure 2A:
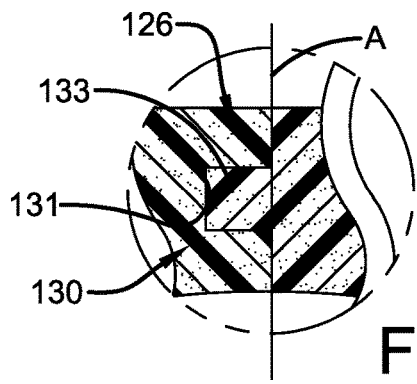
FIG. 2A is an enlarged view of the portion depicted in FIG. 2.
Figure 2B:
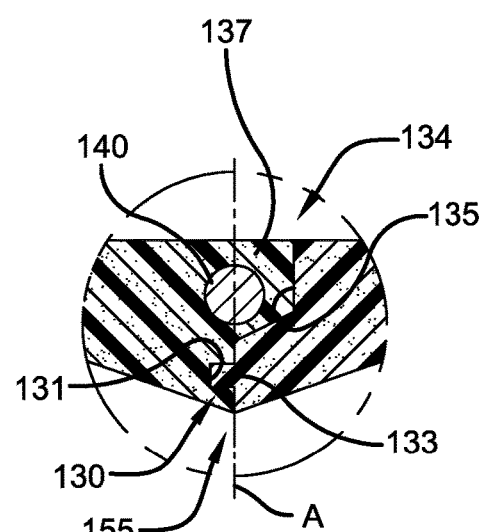
FIG. 2B is an enlarged view of the portion indicated in FIG. 2
Figure 2:
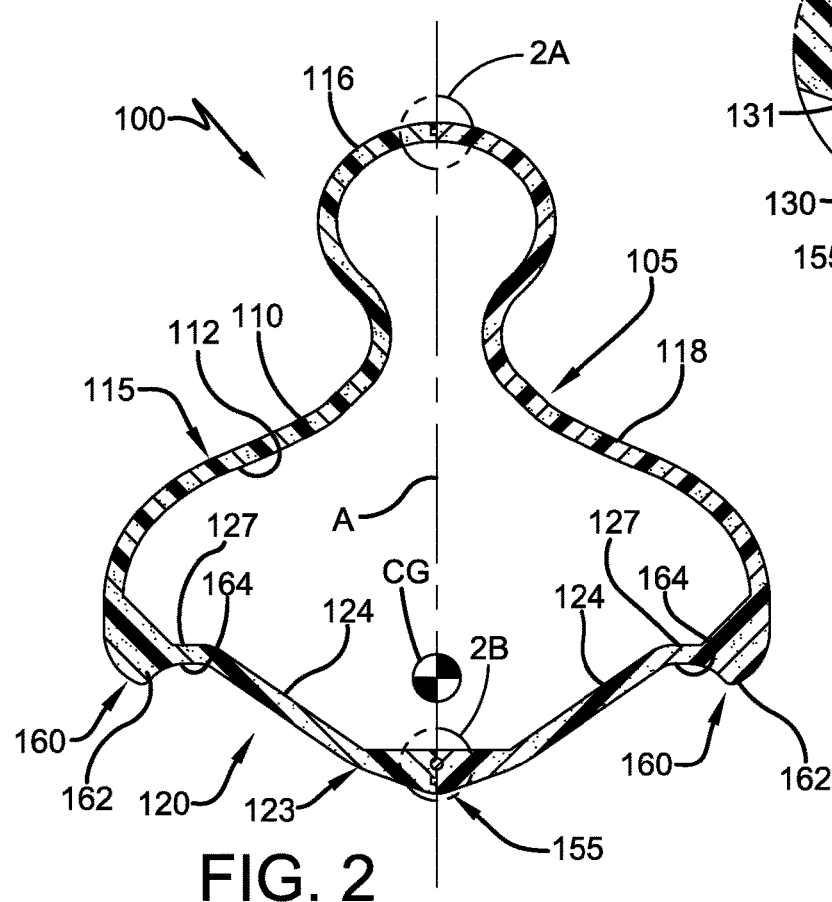
FIG. 2 is a sectioned end view of a decoy according to an example.
Figure 3:
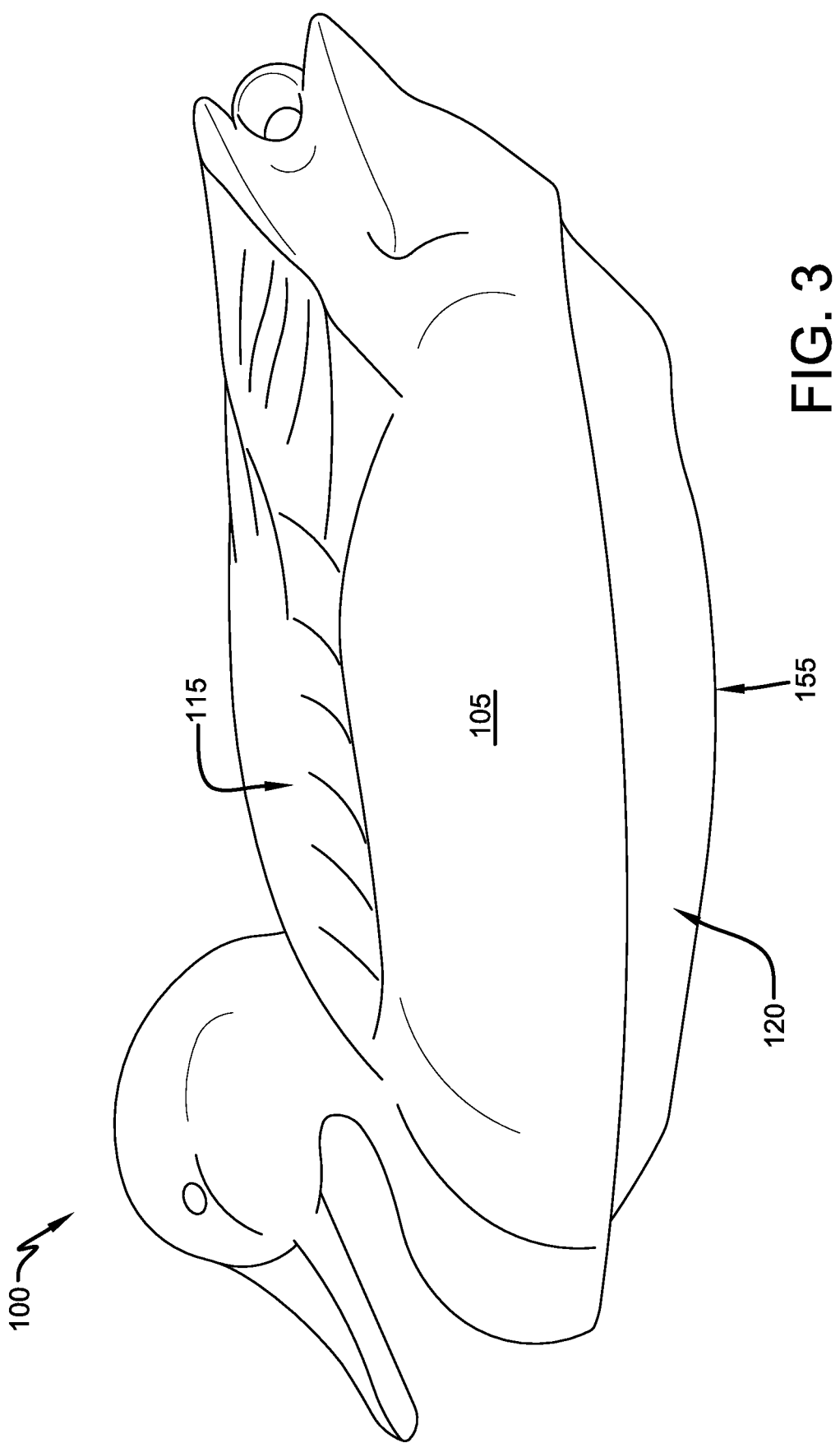
FIG. 3 is a right side view of a left half of a decoy according to an example, where the right half is a mirror image thereof.
Figure 4:
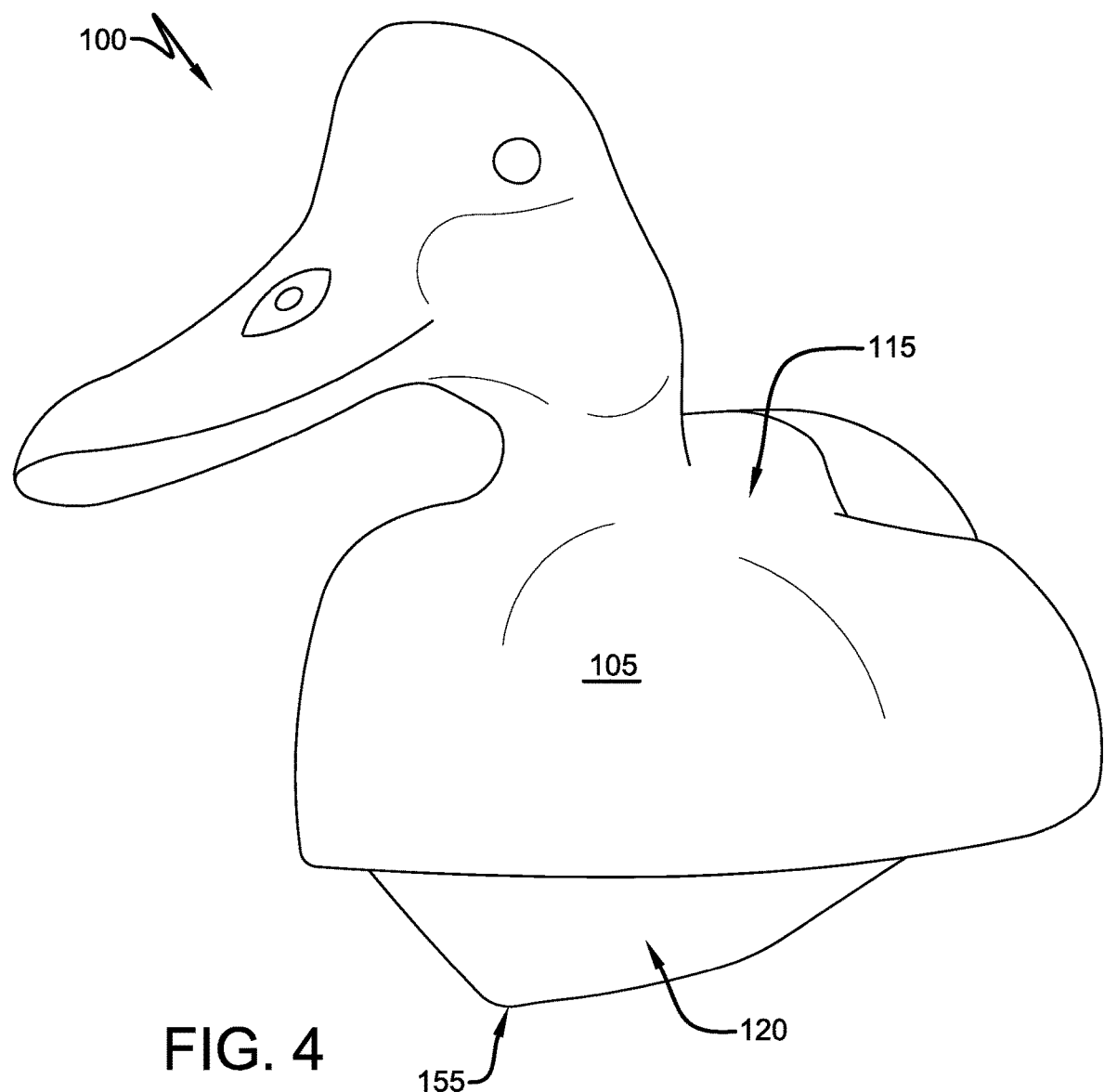
FIG. 4 is a front view thereof.

With respect to FIG. 2A, the tongue and groove joint is shown. Tongue and groove joint 130 includes a groove 131 defined in one-half of the decoy and a tongue 133 extending from the second half of the decoy 100, where the tongue 133 is sized to fit within the groove 131 and provide an interference fit therewith to join the first and second halves of the decoy 100 and seal the cavity 112. As discussed, a second tongue and groove joint 130 (FIG. 2B) may be provided on the lower portion 120 of decoy 100. This joint may be formed in the same manner as the joint shown in FIG. 2A. In addition, as best shown in FIG. 2B a lap joint may be provided at the lower portion 120. The lap joint includes a recess 135 defined in one-half of the decoy 100 and a projecting portion 137 in a second half of the decoy 100. As shown, the recess 135 extends inwardly relative to the centerline A, such that the projecting portion 137 extends beyond the centerline A to engage and fill the recess 135.

In the example shown, a hanger 140 may be provided within the mold such that the material forming the projecting portion 137 is molded around the hanger 140 securing it, within the decoy 100. In the example shown, hanger 140 includes a rod-like member 141, best seen in FIG. 1, that extends from the rear of the decoy 100 to the front of the decoy and includes one or more loops of other suitable connector 142 at an end of the hanger 140 that extend outward of the decoy 100 to provide a fastening point for an anchor or a tether used to gather the decoys. In the example shown in FIG. 1, a pair of loops are provided at each end of hanger member 140. Other examples (see FIGS. 8 and 10) have a single connector 142, such as a loop, at one end. It will be understood that connector 142 may be formed as part of decoy body. It also will be understood that loops or other connectors may be provided in locations other than those shown.

In the example, by providing the hanger member within the lap joint, projecting portion 137 allows the hanger member 140 to be aligned on the centerline A of the decoy 100. Hanger member 140 may be constructed of a material that has a greater density than the material used to form the decoy 100 such that the hanger 140 lowers the center of gravity of the decoy 100 relative to a decoy that does not have a higher density hanger 140. As discussed more completely below, this may assist in self-righting of the decoy 100.

Figure 8:
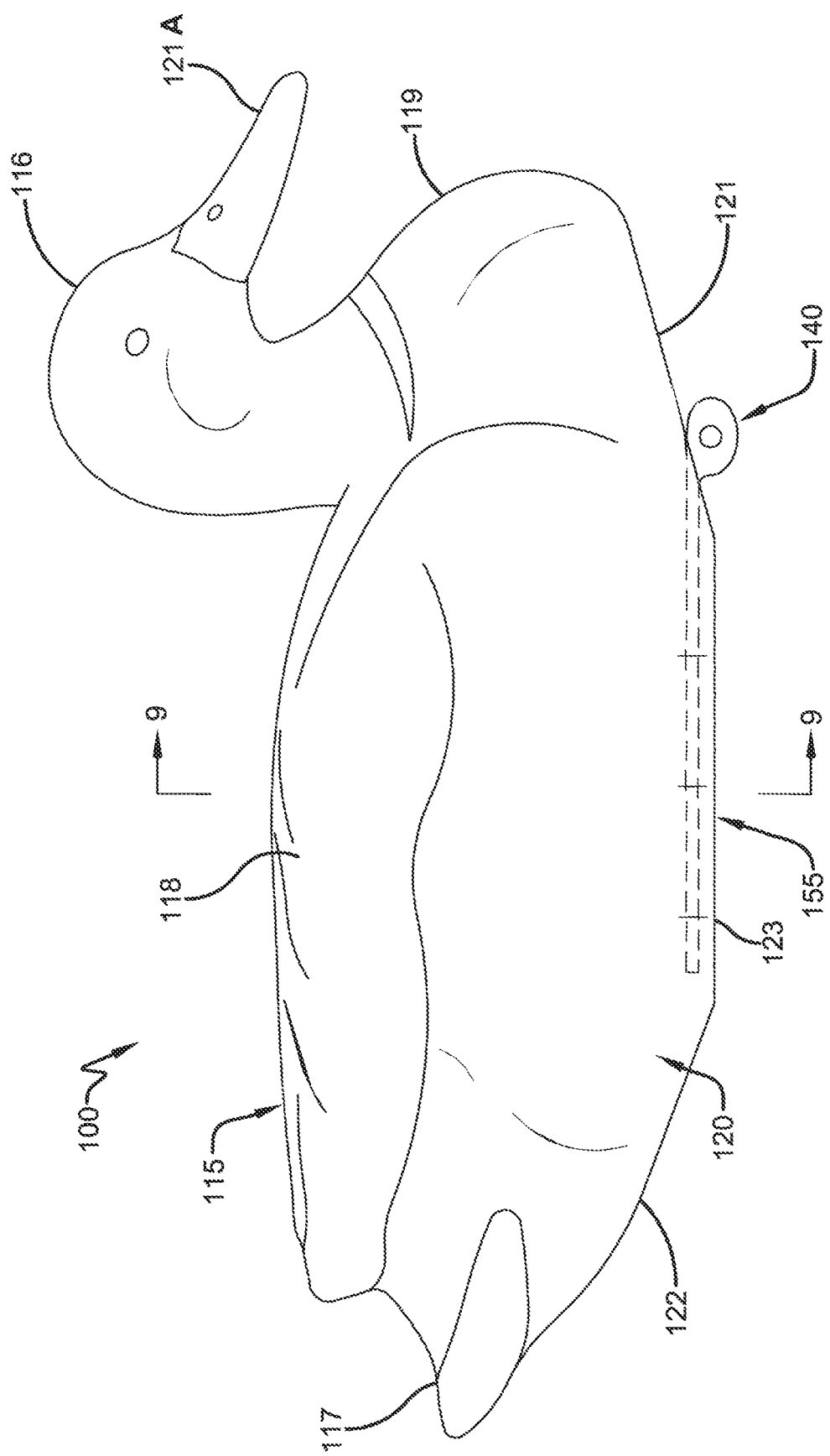
FIG. 8 is a side view of a decoy according to another example.

With reference to FIG. 8, an alternate example of a decoy 100 is shown. In this example, decoy 100 may be initially formed in two parts generally separating the upper portion 115 from lower portion 120. In the example shown, first and second portions of the decoy 100 include parallel inward extending surfaces 151, 152 that overlap each other and may be secured with a fastener F including, but not limited to, a weld, glue, or mechanical fastener. In the example shown, glue is used to attach the upper portion 115 to lower portion 120.

Figure 11:
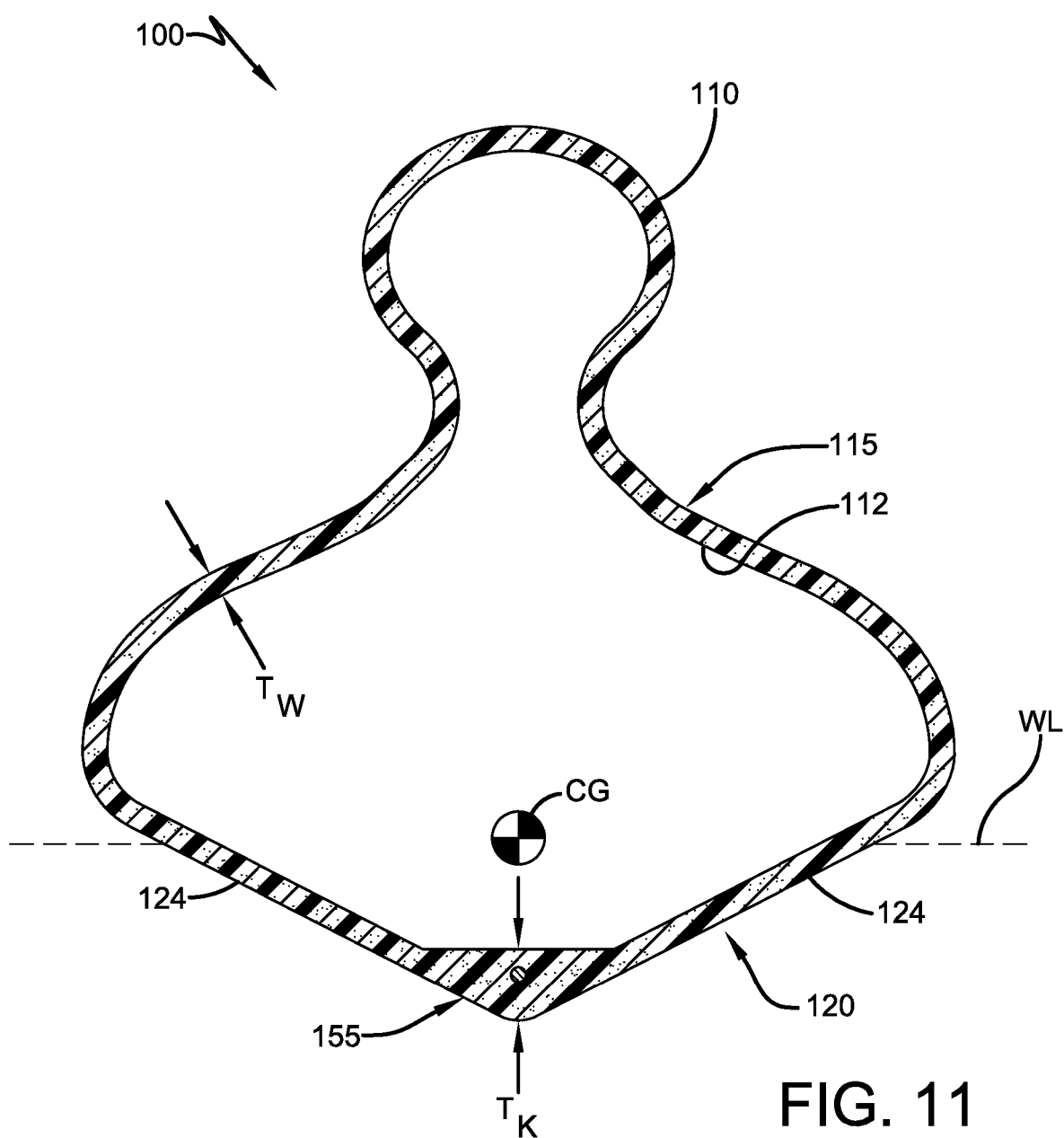
FIG. 11 is a sectioned view as might be seen along line 11-11 in FIG. 10.
Figure 12:
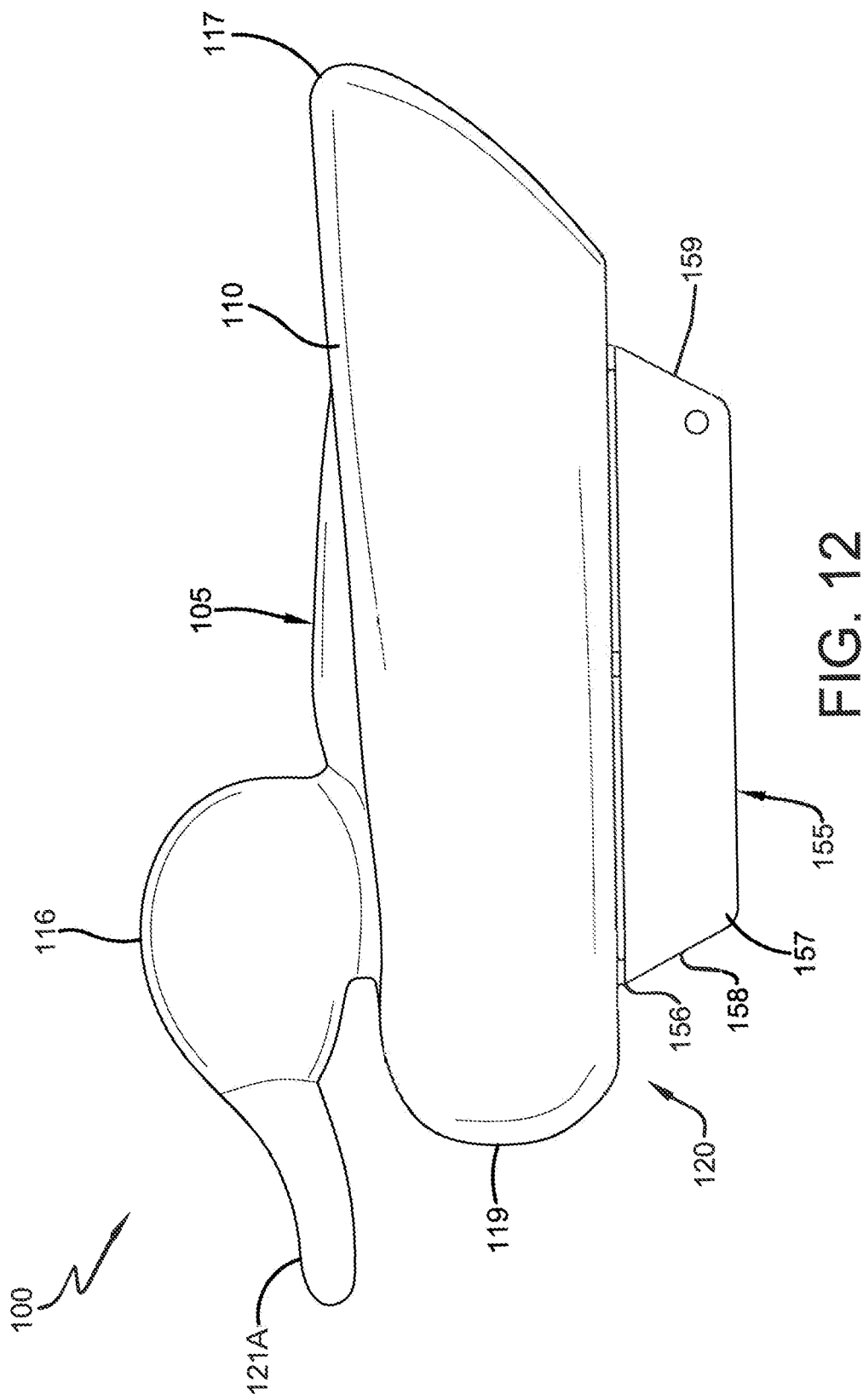
FIG. 12 is a side view of a decoy according to another example.
Figure 13:
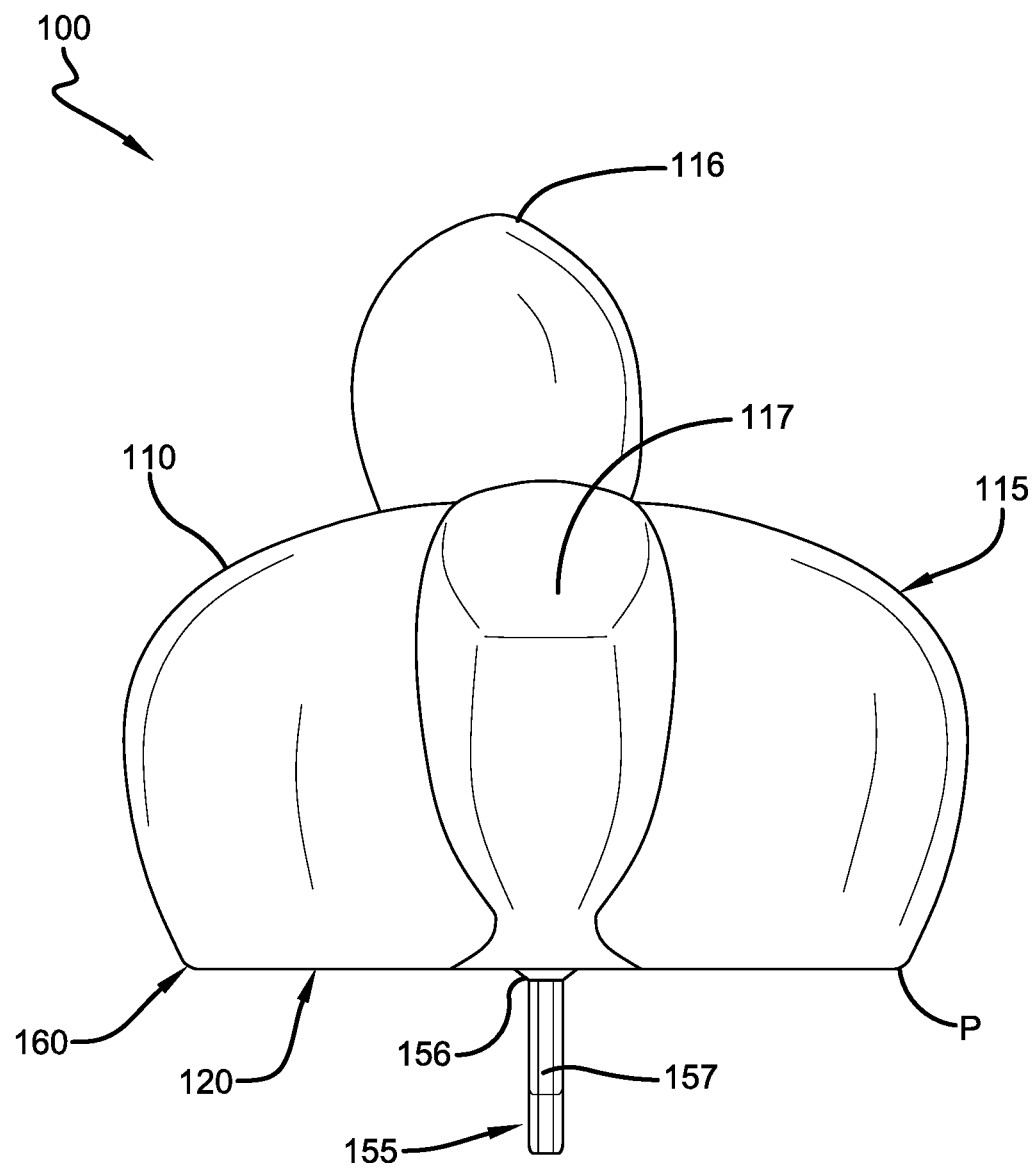
FIG. 13 a rear view thereof.

As in the previous example, the lower portion 120 may include a hanger 140 embedded within the wall 110 of decoy. In the example, wall 110 is thickened at a central lower portion of second half 120 to form an integral keel 155. The thicker material forming keel 155 has the effect of concentrating weight at the lowermost portion of decoy 100. As best shown in FIG. 11, the wall of body along the upper portion has a first thickness Tw, and the wall forming the bottom of the decoy at integral keel 155 has a second thickness Tk, where the second thickness is greater than the first thickness Tw. In addition, the portion of wall 110 forming integral keel 155 may have a somewhat triangular shape to assist the keel 155 in self-righting the decoy 100 in the water. As discussed, to further facilitate the self-righting nature of decoy 100, hanger 140 may be formed from a more dense material than wall 110 to further concentrate the mass in this area and lower the center of gravity of the decoy 100. For example, the hanger may include a steel rod.

The lowering of the center of gravity CG of the decoy 100 by using a thicker wall 110 at the bottom of the decoy 100 or adding a more dense material in this area assists in righting the decoy automatically when it is flipped within the water. The lower center of gravity provides a self-righting action to the decoy when it is in the water. The concentration of mass balances the decoy toward an upright position in the water. Therefore, when decoys are thrown into the water, despite landing on their side or upside down, the concentration of mass coupled with the buoyancy of decoy 100 serves to right the decoy 100 automatically.

Optionally, to further facilitate this self-righting function, additional concentration of material may be provided at the lateral outermost portions of the decoy where the decoy contacts the water line. For example, as best shown in FIGS. 2 and 9, the wall 110 may include thickened portions at these locations to provide concentrated areas of mass where the outermost portion of the decoy contacts the water line. In addition to assisting in self-righting the decoy 100, concentrating mass in these areas is believed to provide stability to the decoy 100 as it rests within the water. It also changes the mass moment of inertia of the decoy such that it is more difficult for the decoy to land in an upside down or sideways position on the water again effectively self-righting the decoy as it is thrown. These portions may be referred to as outrigger portions 160 of the decoy 100.

The outrigger portions 160 stabilize the decoy within the water preventing the decoy 100 from flipping over or falling on its side in response to wind or waves or other outside forces that may impact the decoy after it has been placed in the water. As depicted, the outrigger portions 160 may include a downwardly projecting portion 162 that extends downward and inward from the lateral outermost portion of the decoy 100 to contact the water line WL and raise a portion of the wall 110 above the water line WL. As shown, the outrigger portions may be formed integrally with the wall of decoy. In the examples shown in FIGS. 2 and 9, the downwardly projecting portions extend downward generally parallel to the centerline A and extend such that they lie parallel to a portion of the lower portion 120 defining a gap 164 there between. As shown in FIGS. 2, 7 and 14-16, outrigger may extend about the perimeter of the decoy forming a somewhat oval downwardly extending portion 162 in the form of a lip at the perimeter of the decoy 100. In this example, outrigger 160 is spaced from the keel defining a gap 164 encircling the keel 155. In addition to the outrigger 160 lowering the mass moment of inertia to facilitate the self-righting of the decoy 100, the gap 164 created between the outrigger 160 and the keel 155 is believed to create suction between the decoy and the surface of the water (best shown in FIG. 9) to further stabilize the decoy 100 on the water.

With reference to FIGS. 12-16, another example of a decoy 100 is shown. As described in prior examples, decoy 100 has an upper portion 115 having a shape that resembles or attracts water fowl. The decoy 100 is made to float on water. To that end, the body of decoy 100 has a buoyancy to allow it to float, and may be made hollow as depicted in prior examples.

Figure 14:
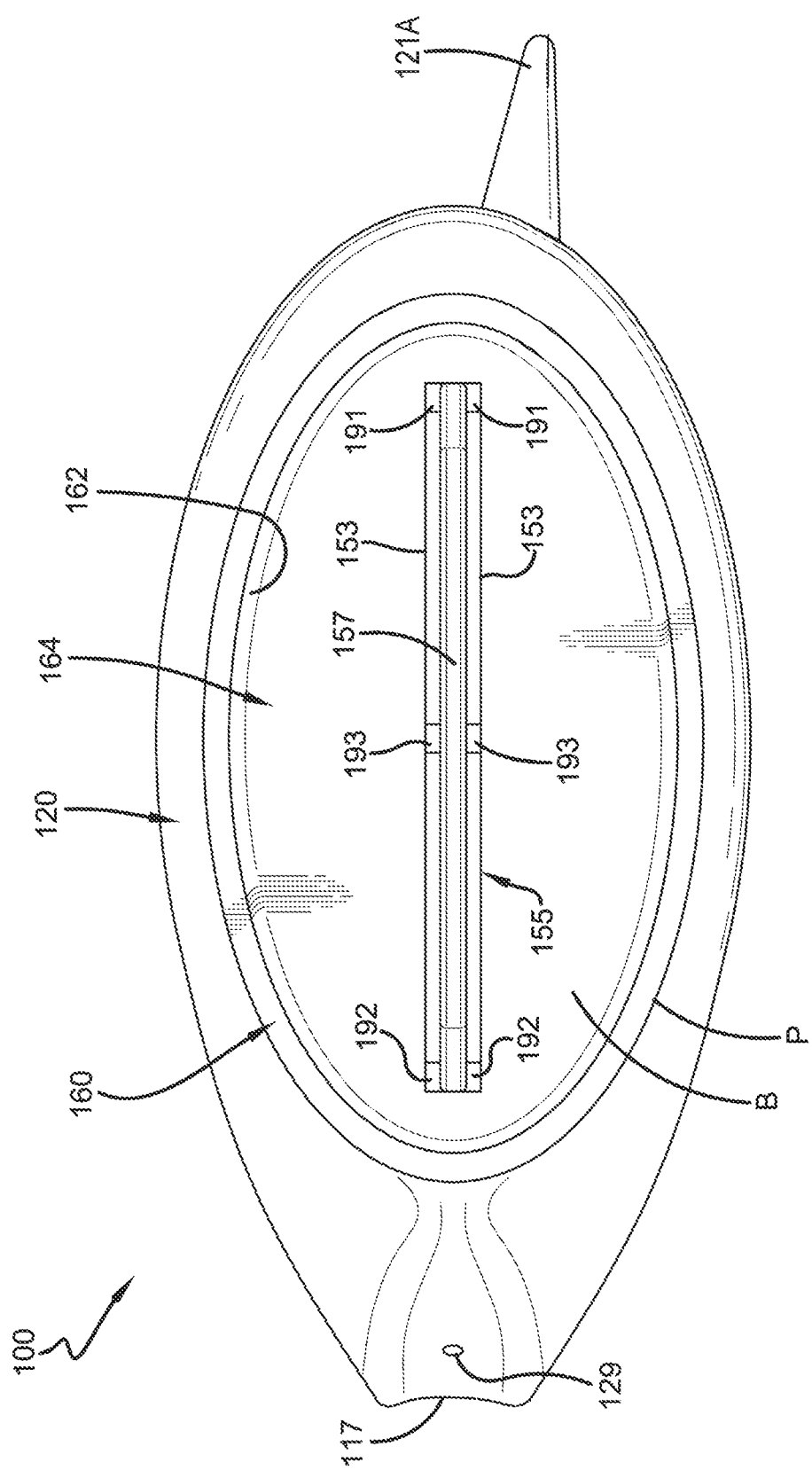
FIG. 14 is a bottom view thereof.

Decoy 100 is configured to collapse in response to an external compressive force for purposes of transport or storage. Decoy 100 is also configured to return to its original shape when such force is released. In general, decoy 100 has a first volume when no, force is applied. When a compressive force is applied, the decoy is compressed to a second volume that is less than the first volume. Upon release of the compressive force, the shape memory of the material returns the decoy to its original configuration and volume. As in previous examples, the body of decoy 100 is made hollow and the wall 110 forming decoy is relatively thin to facilitate its compression and return to its original shape. As described above, the evacuation of air from the volume and re-entry of air within the decoy as it returns to its original shape may occur through the wall of decoy when an air-permeable material is selected or an opening may be provided in the wall for this purpose. As shown in FIG. 14, a vent 129 may be provided in the rear of decoy 100. In this example, vent 129 is formed under a tail portion 117 of decoy 100. Vent 129 may be formed on a lower surface of tail portion 117. This location is elevated from the water line and covered in the event of precipitation to avoid the suction created by reinflation of the decoy from drawing water into the internal cavity of decoy 100.

In the example, decoy 100 is constructed using a roto-molding process to facilitate molding the decoy as a unitary member without additional joining steps needed when molding multiple part decoys shown in earlier examples. The material used to form decoy 100 according to this example may be any of those from the examples described above. In the particular example depicted, a PVC material or polyurethane material was used. These materials are not, however, limiting.

Decoy 100 includes a keel 155 that is formed integrally with the body of decoy 100 during the molding process. As in previous examples, keel 155 concentrates mass below decoy and generally has a greater density than the hollow body 105 of decoy 100. To achieve the greater density, keel 155 may have a thickness greater than the thickness of wall 110 forming the body of decoy 100. To further concentrate mass below the water line, keel 155 may extend downward to increase the amount of material below the waterline proportionate to the amount of extension.

Figure 15:
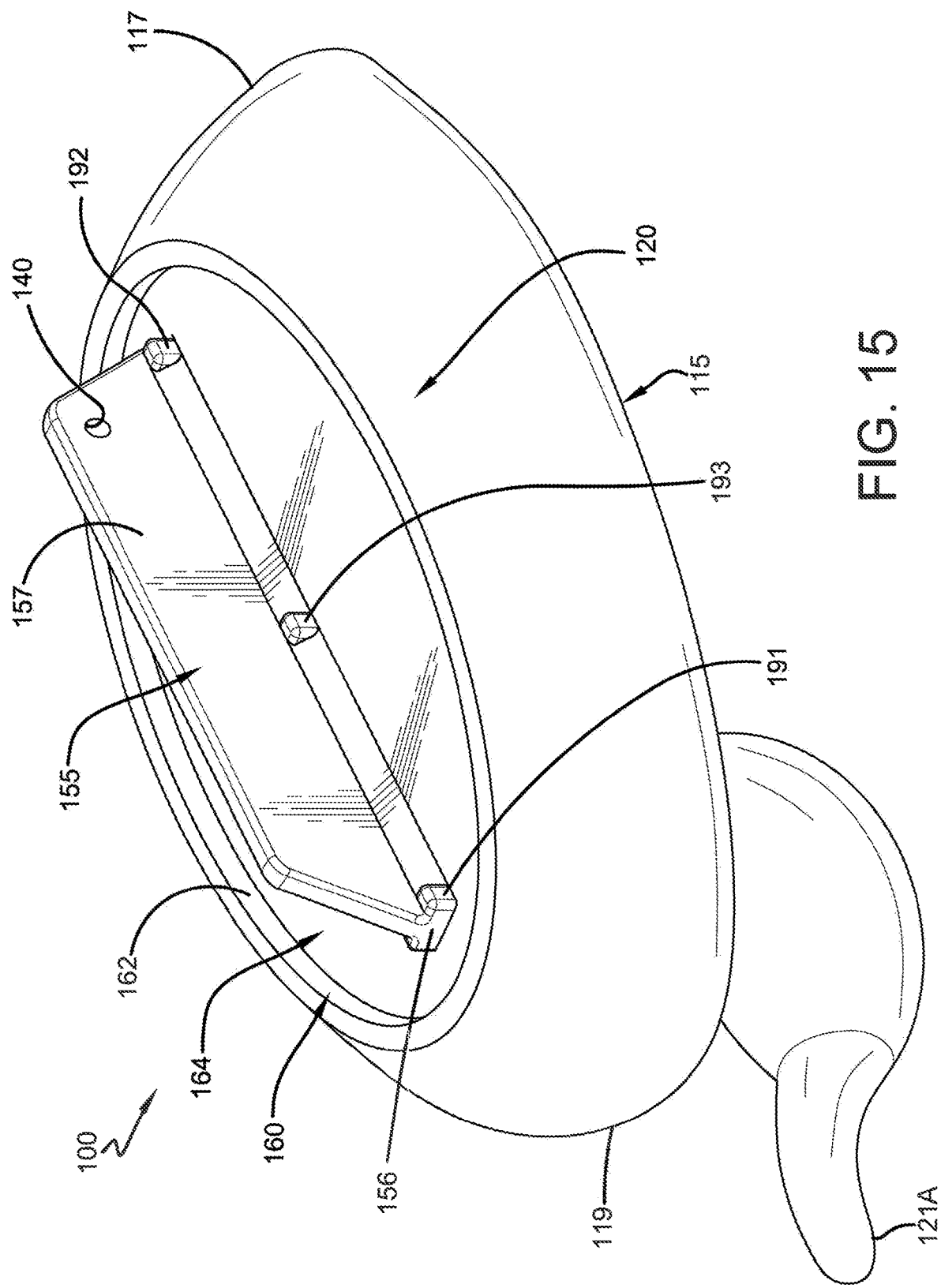
FIG. 15 is a rear bottom perspective view thereof.
Figure 16:
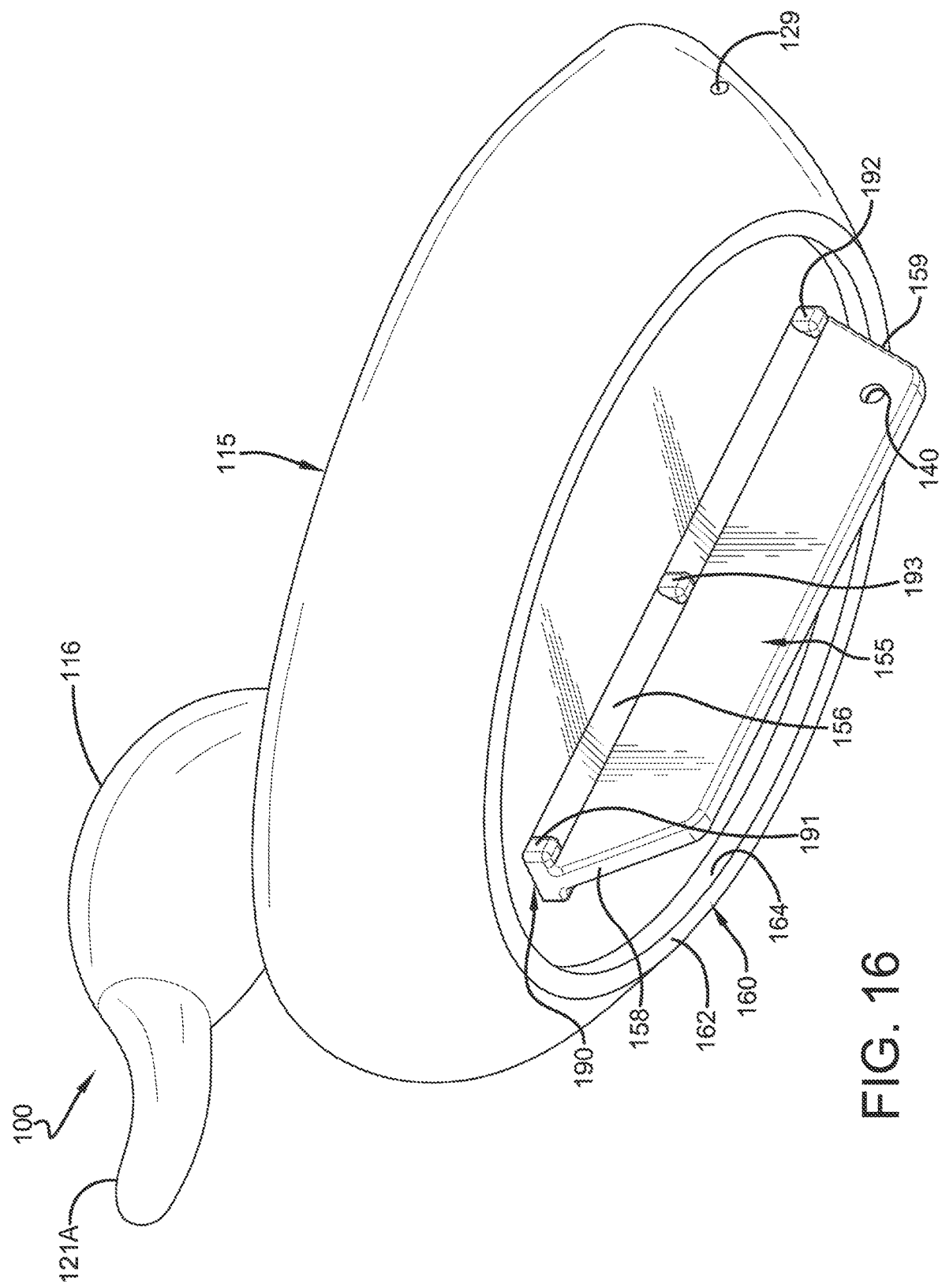
FIG. 16 is a front bottom perspective view thereof.

With particular reference to FIGS. 14-15, keel 155 that extends downward in a generally vertical fashion from a lower surface or base B of decoy. In the example, base B of body 105 is made planar and extends horizontally forming a flat surface from which keel 155 extends. Keel 155 includes a blade 157. Blade 157 is characterized by its downward extension being greater than its width. In the example, keel 155 is located generally along a central axis of decoy 100 with the blade 157 extending downward in line with the central axis A. The blade 157 may include inwardly sloped fore and aft portions 158,159. The slope of these portions facilitates release from the mold and is believed to help the decoy make natural movements when anchored in a body of water. Keel 155 may further include a thickened base 156 that has a wider lateral dimension than blade 157 adding further mass to the keel 155 to further aid in self-righting the decoy 100. In the example, base 156 extends along the base B of decoy 100 generally along central axis A. In the example, base 156 of keel 155 is wider than blade 157 and may have sides 153 that slope inward from base B of decoy 100 to join the sides of blade 157. At least one buttress190 may be provided along base 156 of keel 155 to add strength and mass to the keel 155. In the example, a first buttress 191 is located at one end of keel 155 and is formed within base 156 as a generally rectangular boss. A second buttress 192 similar to first buttress 191 is formed at an opposite end of keel 155. A third buttress 193 may be formed between the first and second ends of keel 155. In the example, third buttress 193 is located midway between first buttress 191 and second buttress 192.

To facilitate attachment of an anchor, a line or tether, keel 155 may include an integrally, formed hanger 140. In the example, hanger 140 is simply an opening formed in keel 155. Hanger 140 may be located anywhere along keel 155 and multiple hangers may be used to provide multiple attachment points. In the example, hanger 140 is formed in an aft section of keel 155 near the lower boundary of blade 157 and the sloped aft section 159.

As in previous examples, an outrigger 160 is formed in wall of decoy 100 extending downward from a perimeter P of the base B of decoy 100. A lip 162 extends downward from the perimeter P of decoy 100 parallel to keel 155 defining a gap 164. As described in previous examples, outrigger 160 assists in self-righting decoy. The gap 164 formed between outrigger 160 and keel 155 may provide greater stability for decoy 100 within water by creating suction between the decoy 100 and the surface of the water.

EXAMPLES

The following are illustrative examples and are not limiting.

Example 1

A decoy comprising: a decoy body having an upper portion shaped to resemble water fowl and a lower portion extending downward from the upper portion; the decoy body including an outer wall defining a cavity therein, wherein the decoy body is constructed of a collapsible shape memory polymer material having an initial volume that collapses under a compressive force to form a second volume that is less than the initial volume, and wherein upon release of the compressive force, the decoy body returns to the initial volume; the lower portion of the decoy body includes an integral keel having a greater thickness than the wall to form a concentrated mass in the lower portion.

Example 2

The decoy of example 1 wherein the body comprises at least one outrigger portion extending downward from the upper portion adjacent to but spaced from a portion of the integral keel to define a gap therebetween.

Example 3

The decoy of example 1 further comprising a hanger molded within the integral keel, the hanger being constructed of a more dense material than the outer wall.

Example 4

The decoy of example 1 further comprising a vent defined within the outer wall and opening into the cavity.

Example 5

The decoy of example 1, wherein the body is constructed of a polymer foam.

Example 6

The decoy of example 5, wherein the polymer foam is a polyurethane foam.

Example 7

The decoy of example 5, wherein the polymer foam is a self-skinning foam.

Example 8

The decoy of example 1, wherein the material has a density of about 200 kg/m$^3$ to about 600 kg/m$^3$.

Example 9

The decoy of example 8, wherein the material has a density of about 350 kg/m$^3$.

Example 10

The decoy of example 1, wherein at least a portion of the body is constructed of a closed cell foam.

Example 11

The decoy of example 1, wherein at least a portion of the body is constructed of an open cell foam.

Example 12

The decoy of example 1, wherein the material has a hardness from about 20-25.

Example 13

The decoy of example 1, wherein the material has a tensile strength of about 0.54×106 Pa.

Example 14

The decoy of example 1, wherein the material has a tensile elongation at break of about 93.1%.

Example 15

The decoy of example 1, wherein the material has an avulsion strength of about 1.66 N/mm.

Example 16

The decoy of example 1, wherein the body includes a skin formed on an exterior surface thereof.

Example 17

The decoy of example 2, wherein at least a portion of one of the first half and second half includes a tongue portion and the other of the first half and second half includes a groove portion configured to receive the tongue portion when the first half and second half are joined.

Example 18

The decoy of example 17, wherein the tongue and groove are formed along an upper portion of the first half and the second half.

Example 19

The decoy of example 2, wherein the first half and the second half form a lap joint at the integral keel.

Example 20

A decoy comprising: a decoy body having a centerline, the decoy body having an upper portion and a lower portion separated by a horizontal plane, wherein the upper portion has a perimeter above the horizontal plane and the lower portion extends downward relative to the upper portion; the decoy body including an outer wall defining a cavity therein, wherein the outer wall of body is constructed of a polymer material, the decoy body having an initial volume, wherein the outer wall is configured to collapse under a compressive force to assume a second volume that is less than the initial volume, and wherein upon release of the compressive force, the decoy body is configured to return to the initial volume; at least one outrigger portion extending from the upper portion near the perimeter downward below the horizontal plane; the at least one outrigger portion being spaced from at least a portion of the lower portion to define a gap therebetween.

Example 21

A decoy according to example 1 or 20 where the polymer material is poly-vinyl-chloride (PVC).

Example 22

A decoy according to example 1, where the keel includes at least on buttress.

Example 23

A decoy according to example 22, where the keel includes a first buttress, a second buttress and a third buttress, where the first buttress and second buttress are formed at opposite ends of the keel and the third buttress is formed between the first buttress and the second buttress.

Example 24

A decoy according to example 23, where the third buttress is centered between the first and second buttresses.

Example 25

A decoy according to example 22, wherein the buttress includes a generally rectangular boss.

Example 26

A decoy according to example 1, where the keel includes a base extending downward from a lower surface of the decoy and a blade extending downward from the base.

Example 27

A decoy according to example 26, wherein the base extends downward and inward from the lower surface of the decoy to slope toward the blade.

Example 28

The decoy of example 1 further comprising a hanger molded within the integral keel, the hanger including at least one eye extending outward of the decoy body.

Example 29

The decoy of example 3, wherein the hanger includes a rod-like member molded within the integral keel having a first eye at one end and a second eye at an opposite end, each eye extending outward of the integral keel.

Example 30

The decoy of example 1, wherein the outer wall defines a shape resembling waterfowl having a head portion and a tail portion, wherein the outer wall defines a vent opening into the cavity, the vent being located with a lower surface of the tail portion above the lower portion of the decoy.

Specific examples of a water fowl decoy innovation are disclosed herein. One of ordinary skill in the art will readily recognize that the innovation may have other applications in other environments. In fact, many embodiments and implementations are possible. The following claims are in no way intended to limit the scope of the subject innovation to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the subject innovation has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (e.g., enclosures, sides, components, assemblies, etc.), the terms (including a reference to a "means") used to describe such elements are intended to correspond, unless otherwise indicated, to any element which performs the specified function of the described element (e.g., that is functionally equivalent), even though not structurally equivalent to the disclosed structure which performs the function in the herein illustrated exemplary embodiment or embodiments of the innovation. In addition, while a particular feature of the innovation may have been described above with respect to only one or more of several illustrated embodiments, such feature may be combined with one or more other features of the other embodiments, as may be desired and advantageous for any given or particular application. Although certain embodiments have been shown and described, it is understood that equivalents and modifications falling within the scope of the appended claims will occur to others who are skilled in the art upon the reading and understanding of this specification.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

The invention claimed is:

1. A decoy comprising:
a decoy body including an outer wall forming an upper portion configured to resemble a waterfowl and including an integrally formed head portion;
the outer wall defining a cavity therein, wherein the outer wall of the decoy body is constructed of a collapsible shape memory polymer material having an initial volume, wherein the outer wall is configured to collapse under a compressive force to assume a second volume that is less than the initial volume and wherein upon release of the compressive force, the outer wall returns to the initial volume;
at least one outrigger extending downward from the upper portion, wherein the outrigger extends downward below a base of the decoy body and is configured to extend at least partially below a waterline when the decoy is placed in water;
a keel extending downward from the base of the decoy body and located inward of the at least one outrigger, wherein a gap is defined between the at least one outrigger and the keel, wherein the keel includes a blade having a width, wherein the blade extends downward from the base more than the width of the blade;
the decoy further comprising a first buttress extending downward relative to the base and laterally outward from each side of the blade; and
a second buttress extending downward relative to the base and laterally outward from each side of the blade, the first buttress and second buttress being spaced from each other.

2. The decoy of claim 1 wherein the keel is integrally formed with the decoy body.

3. The decoy of claim 1 further comprising a hanger molded within the keel, the hanger being constructed of a more dense material than the outer wall.

4. The decoy of claim 1 further comprising a vent defined within the outer wall and opening into the cavity.

5. The decoy of claim 1, wherein the body is constructed of a polymer foam.

6. The decoy of claim 5, wherein the polymer foam is a polyurethane foam.

7. The decoy of claim 1, wherein the polymer material is poly-vinyl-chloride.

8. The decoy of claim 1, wherein the material has a density of about 200 kg/m$^3$ to about 600 kg/m$^3$.

9. The decoy of claim 8, wherein the material has a density of about 350 kg/m$^3$.

10. The decoy of claim 1, wherein at least a portion of the decoy body is constructed of a closed cell foam.

11. The decoy of claim 1, wherein at least a portion of the decoy body is constructed of an open cell foam.

12. The decoy of claim 1, wherein the material has a hardness from about 20-25.

13. The decoy of claim 1, wherein the material has a tensile strength of about 0.54×106 Pa.

14. The decoy of claim 1, wherein the material has a tensile elongation at break of about 93.1%.

15. The decoy of claim 1, wherein the material has an avulsion strength of about 1.66 N/mm.

16. The decoy of claim 1, wherein the body includes a skin formed on an exterior surface thereof.

17. The decoy of claim 1 wherein the first buttress is attached to the base at one end of the blade and the second buttress is attached to the base at an opposite end of the blade, wherein the blade slopes inward from the first buttress and second buttress, the blade defining an opening outward of the base of the decoy and inward of the first buttress and second buttress.

18. The decoy of claim 1 wherein the perimeter of the decoy body defines an oval shape, wherein the at least one outrigger extends downward from at least a portion of the perimeter, the at least one outrigger being curved due to the oval shape of the perimeter.

\* \* \* \* \*